United States Patent

Ikegawa et al.

[11] Patent Number: 5,870,262
[45] Date of Patent: Feb. 9, 1999

[54] MAGNETO RESISTIVE EFFECT TYPE HEAD HAVING A STRESSED INSULATION LAYER

[75] Inventors: Yukinori Ikegawa; Mutsuo Yoshinami; Eiji Shimizu; Keiji Watanabe, all of Kanagawa, Japan

[73] Assignee: Fujitsu Limited, Kawasaki, Japan

[21] Appl. No.: 755,543

[22] Filed: Nov. 21, 1996

[30] Foreign Application Priority Data

Jun. 11, 1996 [JP] Japan ................................. 8-149010

[51] Int. Cl.$^6$ ........................................................ G11B 5/31
[52] U.S. Cl. ........................................ 360/126; 360/113
[58] Field of Search ............................ 360/113, 119, 360/120, 125, 126

[56] References Cited

U.S. PATENT DOCUMENTS

| | | | |
|---|---|---|---|
| 5,408,373 | 4/1995 | Bajorek et al. | 360/104 |
| 5,536,584 | 7/1996 | Sotokawa et al. | 428/458 |
| 5,560,097 | 10/1996 | Bajhorek et al. | 29/603.12 |
| 5,570,251 | 10/1996 | Shinoura et al. | 360/126 |
| 5,640,753 | 6/1997 | Schultz et al. | 29/603.08 |
| 5,702,756 | 12/1997 | McKean et al. | 427/127 |

FOREIGN PATENT DOCUMENTS 7-235014  9/1995  Japan .

*Primary Examiner*—Jefferson Evans
*Attorney, Agent, or Firm*—Greer, Burns & Crain, Ltd.

[57] ABSTRACT

A method is disclosed for producing a magneto-resistive effect type thin film magnetic head including a thin film coil, a pair of magnetic poles and an insulation layer consisting of a thermosetting resin for electrically insulating mutually between the thin film coil and the magnetic poles. A photoresist material is used as the thermosetting resin. A thermal treatment of the thermosetting resin is conducted in an atmosphere including at least oxygen, in such a manner that a film stress of the insulation layer after thermal treatment is within a range of −10 MPa to +25 MPa.

10 Claims, 3 Drawing Sheets

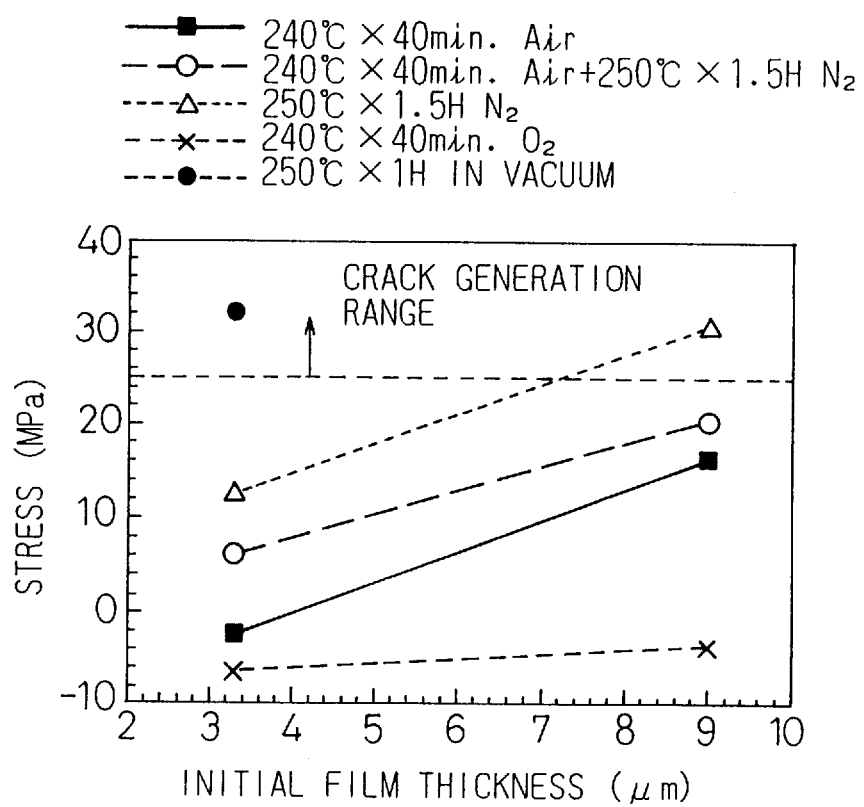

MAGNETO RESISTIVE EFFECT TYPE HEAD HAVING A STRESSED INSULATION LAYER

BACKGROUND OF THE INVENTION

1. Field of the Invention

The present invention relates to a magnetic head, particularly to a magneto-resistive effect type thin film magnetic head, used for writing/reading information to a recording medium in a magnetic disk device used as an external storage device for a computer or the like. This invention also relates to a method for producing such a magneto-resistive effect type thin film magnetic head.

2. Description of the Related Art

An example of conventionally known method for producing a magneto-resistive effect type thin film magnetic head will now be described with reference to FIGS. 1, 2 and 3. In these drawings, (a) denotes an insulation substrate; (b), a lower shield layer; (c), a first gap; (d), a magnetic resistance element; (e), a second gap; (f), an upper shield; (g), a third gap; (h), a back gap; (i), a lower insulation layer between layers; (j), a thin film coil; (k), an upper insulation layer between layers; (l), a coil terminal; (m), an upper magnetic pole; and (n), a coil lead line.

A lower shield layer (b) of a soft magnetic material is formed on an insulation substrate (a) to form a desired pattern of the shield layer. Then, a first gap film (c) of an insulation material is formed on the lower shield layer (b) and thereafter a magnetic resistance element (d) and an electrically conductive lead line (not shown) are formed on the first gap film (c). A second gap film (e) of an insulation material is then formed thereon to complete a reading element.

Then, an upper shield (f) which also functions as a lower magnetic pole is formed so as to have a desired pattern. Thereafter, a third gap film (writing gap) (g) of an insulation material is formed and, simultaneously, a back gap (h) which is served as a window of a magnetic circuit for mutually connecting the lower magnetic pole (f) and an upper magnetic pole (m).

Then, a coil layer (j) is formed and then an upper photoresist insulation layer (k) between layers is formed so as to cover the coil layer (j) in such a manner that the coil layer (j) is insulated from the lower and upper magnetic poles (f) and (m). In this case, the photoresist is first patterned to be a predetermined shape by photolithography. Then, the photoresist pattern is thermally treated at a temperature lower than the heat resistance temperature of the magnetic resistance element (d) to harden the photoresist to form a lower insulation layer (i). Then, the coil layer (j) is formed by plating with copper (Cu) or the like and thereafter the upper insulation layer (k) between layers is formed by hardening it at the same thermal treatment condition of the above.

Finally, the oxidized film on the back gap (h) is removed and the coil terminal (l) is produced by ion etching and thereafter the upper magnetic pole (m) and a coil lead line (n) are formed by plating or the like to complete a writing element.

As mentioned above, in the known method for producing a magneto-resistive effect type thin film magnetic head, the lower insulation layer (i) between layers and the upper insulation layer (k) between layers were formed by hardening the photoresist by a thermal treatment. The treating atmosphere was an inert gas, such as nitrogen gas ($N_2$), argon gas (Ar), or a vacuum condition, and the treating time was 2 to 3 hours.

However, the insulation layers (i) and (k) which were obtained by a thermal treatment under the condition of an inert gas, such as nitrogen gas ($N_2$), argon gas (Ar), or a vacuum condition, have a problem in that a crack was easily generated in these insulation layers (i) and (k) during the coil forming process or the upper magnetic pole forming process, especially at the time when an ion milling was performed or when an ultrasonic cleaning was performed in an organic solvent. In addition, in the prior art, if the heat resistance of the magnetic resistance element (d) was relatively low as compared with the thermal treating temperature (for example, 250° to 280° C.), the thermal treating temperature of these insulation layers (i) and (k) should be lowered so as to match the heat resistance of the magnetic resistance element (d). However, in the prior art, if the thermal treating temperature of these insulation layers (i) and (k) was lowered under the condition of the above-mentioned atmosphere, there would be a problem that a crack would more easily be generated in these insulation layers (i) and (k).

That is to say, as shown in FIG. 4, in the case of the insulation layers (i) and (k) which were treated in the vacuum condition, a stress (MPa) in these layers is relatively large and therefore is within a range of the crack generation, even at a stage before the thermal treatment is performed in which the initial film thickness is thin, as indicated by mark ∎ in FIG. 4.

If the insulation layers (i) and (k) were treated in the nitrogen gas ($N_2$) condition at a temperature of 250° C. for 1.5 hours, a stress (MPa) becomes relatively larger than 2.5 MPa and within a range of the crack generation, if the initial thickness before thermal treatment was larger than 7 μm, as indicated by mark Δ in FIG. 4.

SUMMARY OF THE INVENTION

An object of the present invention is to provide a magneto-resistive effect type thin film magnetic head and a method for producing such a magneto-resistive effect type thin film magnetic head, in which a stress exerted in the thermally treated portion can be reduced so that no crack is generated in the insulation layers.

According to the present invention, there is provided a magneto-resistive effect type thin film magnetic head comprising: a thin film coil; at least a pair of magnetic poles; an insulation layer consisting of a thermosetting resin for mutually electrically insulating the thin film coil and the magnetic poles; and the thermosetting resin consisting of a photoresist material and a film stress of the insulation layer after thermal treatment being within a range of −10 MPa to +25 MPa.

According to another aspect of the present invention, there is provided a method for producing a magneto-resistive effect type thin film magnetic head comprising a thin film coil, at least a pair of magnetic poles and an insulation layer consisting of a thermosetting resin for mutually electrically insulating the thin film coil and the magnetic poles, the method comprising: using a photoresist material as the thermosetting resin; and conducting a thermal treatment of the thermosetting resin under a condition of an atmosphere including at least oxygen, in such a manner that a film stress of the insulation layer after thermal treatment is within a range of −10 MPa to +25 MPa.

It is preferable that the oxygen atmosphere for thermal treatment includes 90% oxygen.

It is also preferable that the oxygen atmosphere for thermal treatment be atmospheric air.

It is also preferable that a film thickness of the insulation layer before thermal treatment is not more than 10 μm. It is also preferable that a temperature condition of the thermal treatment is 180° C. to 210° C.

It is also preferable that a time of the thermal treatment is not less than 20 minutes and not more than 60 minutes.

It is also preferable the insulation layer is thermally treated under a condition of the oxygen atmosphere and thereafter thermally treated again under a condition of the nitrogen atmosphere. In this case, the thermal treatment under the nitrogen atmosphere may be conducted at a temperature lower than the thermal treatment under the oxygen atmosphere. Also, the thermal treatment under the nitrogen atmosphere may be conducted for not less than 1 hour and not more than 2 hours.

BRIEF DESCRIPTION OF THE DRAWINGS

FIG. 4 is a diagram showing the relationship between the initial thickness of the photoresist film before thermal treatment and a stress of the photoresist film after thermal treatment.

DETAILED DESCRIPTION OF THE EMBODIMENTS

Figure 1A:
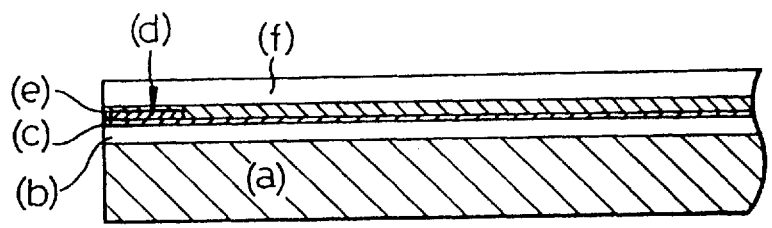
FIGS. 1a–1f are illustrations for explaining a process including respective steps for producing a magneto-resistive effect type thin film magnetic head.
Figure 1B:
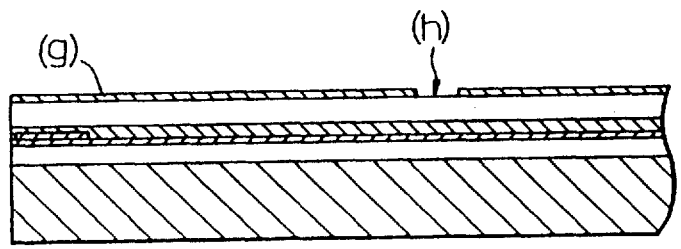
Figure 1C:
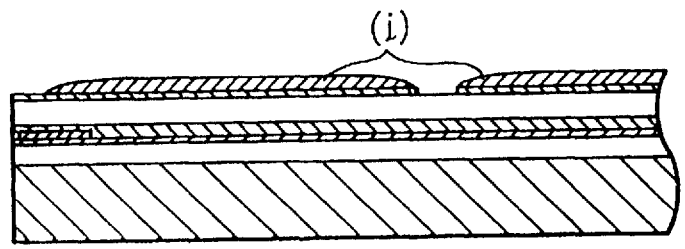
Figure 1D:
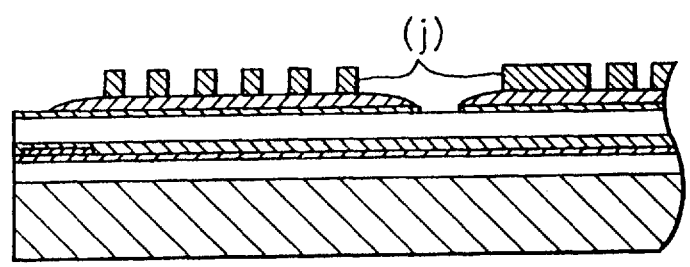
Figure 1E:
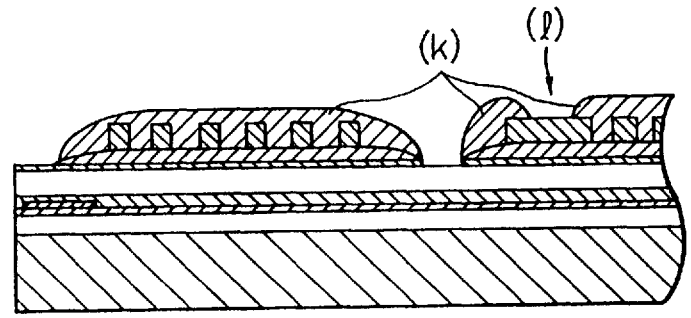
Figure 1F:
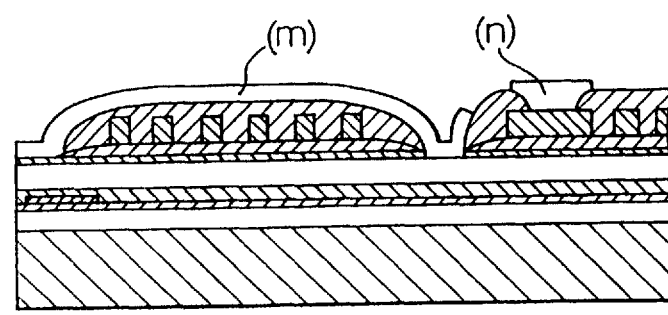
Figure 2:
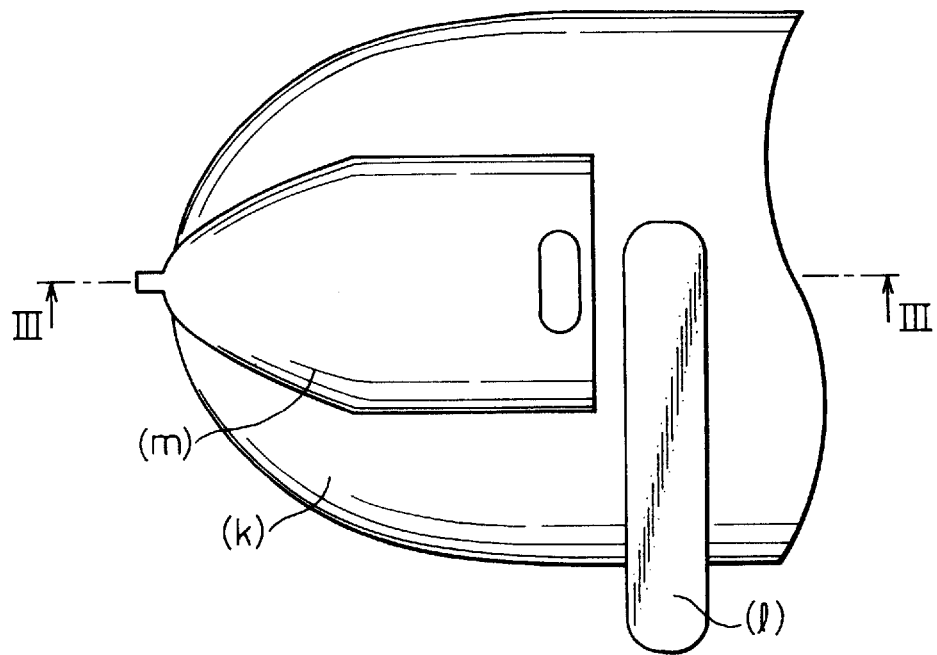
FIG. 2 is a plan view of a completed magneto-resistive effect type thin film magnetic head.
Figure 3:
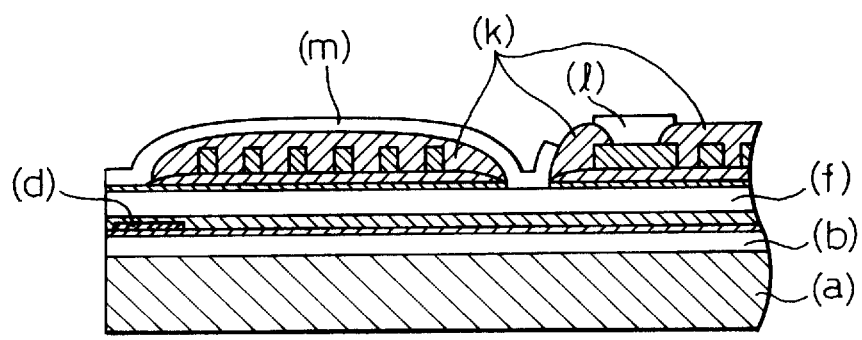
FIG. 3 is a cross-sectional view of the magneto-resistive effect type thin film magnetic head taken along a line III—III in FIG. 2.

The present invention will be described below in more detail with reference to the preferred embodiments illustrated in FIGS. 1, 2 and 3.

In the same manner as the prior art, the magneto-resistive effect type thin film magnetic comprises an insulation substrate (a), a lower shield layer (b), a first gap (c), a magnetic resistance element (d), a second gap (e), an upper shield (f), a third gap (g), a back gap (h), a lower insulation layer between layers (i), a thin film coil (j), an upper insulation layer between layers (k), a coil terminal (l), an upper magnetic pole (m), and a coil lead line (n).

First, in the same manner as the prior art, a lower shield layer (b) of a soft magnetic material is formed on a substrate (a) of an insulation material, such as an alumina ($Al_2O_3$), to form a desired pattern of the shield layer. Then, a first gap film (c) of an insulation material, such as an alumina ($Al_2O_3$), is formed on the lower shield layer (b) by sputtering or the like, and thereafter a magnetic resistance element (d) and an electrically conductive lead line (not shown) are formed on the first gap film (c). A second gap film (e) of an insulation material, such as an alumina ($Al_2O_3$), is then formed thereon to complete a reading element.

Then, an upper shield (f) which also functions as a lower magnetic pole is formed so as to have a desired pattern. Thereafter, a third gap film (writing gap) (g) of an insulation material, such as an alumina ($Al_2O_3$), is formed simultaneously with a back gap (h) which serves as a window of a magnetic circuit for mutually connecting the lower magnetic pole (f) and an upper magnetic pole (m).

A coil layer (j) is formed and then an upper photoresist insulation layer (k) between layers is formed so as to cover the coil layer (j) in such a manner that the coil layer (j) is insulated from the lower and upper magnetic poles (f) and (m). In this case, the photoresist is first patterned to be a predetermined shape by photolithography. Then, the photoresist pattern is thermally treated at a temperature, for example 240° C., which is lower than a heat resistance temperature of the magnetic resistance element (d) to harden the photoresist to form a lower insulation layer (i). Then, the coil layer (j) is formed by plating copper (Cu) or the like and thereafter the insulation layer between upper layers is formed by hardening it at the same thermal treatment condition of the above.

Finally, the oxidized film on the back gap (h) and the coil leading window (l) is sufficiently removed by ion etching and thereafter the upper magnetic pole (m) and a coil leading line (n) are formed by plating or the like to complete a writing element.

In an embodiment of this invention, the lower insulation layer (i) between layers and the upper insulation layer (k) between layers, consisting of a photoresist material, were formed by hardening the photoresist by a thermal treatment in an atmosphere containing oxygen.

FIG. 4 shows some experimental results, i.e., the relationship between the initial thickness of the photoresist film before thermal treatment and a stress of the photoresist film after thermal treatment under respective conditions of thermal treatment. As can be clearly seen from these experimental results, if the film stress (MPa) after thermal treatment was within −10 MPa to +25 MPa, no crack was generated. Also, if the photoresist films were thermally treated in an oxygen atmosphere at a temperature of 240° C. for 40 minutes (see mark x in FIG. 4), or thermally treated in the atmosphere at a temperature of 240° C. for 40 minutes (see mark ■ in FIG. 4), or thermally treated in the atmosphere at a temperature of 240° C. for 40 minutes and thereafter thermally treated in the nitrogen gas ($N_2$) condition for 1.5 hours (see mark ○ in FIG. 4), the film stress (MPa) after thermal treatment was within −10 MPa to +25 MPa and thus favorable results could be obtained.

Therefore, if the photoresist insulation layers (i) and (k) between layers is thermally treated under these conditions, no cracks are generated during the subsequent manufacturing process of the magneto-resistive effect type thin film magnetic head.

As described above, according to the present invention, if the thermal treatment was conducted under the atmosphere containing oxygen, a stress exerted on a surface of the insulation layers between photoresist layers are within a range of −10 MPa to +25 MPa and therefore a generation of cracks in these layers can effectively be prevented. In addition, since the thermal treatment is conducted in an atmosphere containing oxygen, the thermal treatment can be conducted at a lower temperature for a shorter time as compared with the prior art. Thus, a temperature margin in a thermally hardening treatment can be widened, so that this invention can also be applied to a magnetic resistance element having a relatively low heat resistance and reliability in a process for producing a magneto-resistive effect type thin film magnetic head.

It should be understood by those skilled in the art that the foregoing description relates to only some preferred embodiments of the present invention and that various changes and modifications may be made to the invention without departing from the spirit and scope thereof.

We claim:

1. A method for producing a magneto-resistive effect type thin film magnetic head comprising a thin film coil, at least a pair of magnetic poles and an insulation layer consisting of a thermosetting resin for electrically insulating mutually between the thin film coil and the magnetic poles, the method comprising:

using a photoresist material as the thermosetting resin; and conducting a thermal treatment of the thermosetting resin in an atmosphere including at least oxygen, in such a manner that a film stress of the insulation layer after thermal treatment is within a range of −10 MPa to +25 MPa.

2. A method as set forth in claim 1, wherein the oxygen atmosphere for thermal treatment includes not less than 90% oxygen.

3. A method as set forth in claim 1, wherein the oxygen atmosphere for thermal treatment is atmospheric air.

4. A method as set forth in claim 1, wherein a film thickness of the insulation layer before thermal treatment is not more than 10 μm.

5. A method as set forth in claim 1, wherein a temperature of the thermal treatment is 180° C. to 210° C.

6. A method as set forth in claim 1, wherein a time of the thermal treatment is not less than 20 minutes and not more than 60 minutes.

7. A method as set forth in claim 1, wherein the insulation layer is thermally treated under a condition of an oxygen atmosphere and thereafter thermally treated again under a condition of a nitrogen atmosphere.

8. A method as set forth in claim 7, wherein the thermal treatment under the nitrogen atmosphere is conducted at a temperature lower than the thermal treatment under the oxygen atmosphere.

9. A method as set forth in claim 1, wherein the thermal treatment under the nitrogen atmosphere is conducted for not less than 1 hour and not more than 2 hours.

10. A magneto-resistive effect type thin film magnetic head comprising:

a thin film coil;

at least one pair of magnetic poles;

an insulation layer for electrically insulating said thin film coil from said magnetic poles, said insulating layer being a thermosetting resin of a photoresist material, and being formed by performing a thermal treatment on said thermosetting resin in an atmosphere containing oxygen in a manner such that a film stress of said insulation layer after said thermal treatment is within a range of −10 Mpa to +25 Mpa.

* * * * *